(12) United States Patent  
Hirota

(10) Patent No.: US 8,970,621 B2  
(45) Date of Patent: Mar. 3, 2015

(54) INFORMATION PROCESSING APPARATUS AND CONTROL METHOD THEREOF, AND RECORDING MEDIUM FOR CHANGING OVERLAP ORDER OF OBJECTS

(75) Inventor: Yuichiro Hirota, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 322 days.

(21) Appl. No.: 13/557,846

(22) Filed: Jul. 25, 2012

(65) Prior Publication Data

US 2013/0050256 A1 Feb. 28, 2013

(30) Foreign Application Priority Data

Aug. 30, 2011 (JP) .................................. 2011-187854  
Jul. 12, 2012 (JP) .................................. 2012-156927

(51) Int. Cl.
*G09G 5/00* (2006.01)
*G06F 9/44* (2006.01)
*G06F 3/0481* (2013.01)

(52) U.S. Cl.
CPC ............ *G06F 9/4443* (2013.01); *G06F 3/0481* (2013.01)
USPC .......................................................... 345/629

(58) Field of Classification Search
CPC .............................. G06F 3/0481; G06T 11/60
USPC .......................................................... 345/629
See application file for complete search history.

(56) References Cited

U.S. PATENT DOCUMENTS

2007/0291308 A1* 12/2007 Miyamoto ................... 358/1.18

FOREIGN PATENT DOCUMENTS

JP 2007-328029 12/2007

* cited by examiner

*Primary Examiner* — Devona Faulk  
*Assistant Examiner* — Peter Hoang  
(74) *Attorney, Agent, or Firm* — Cowan, Liebowitz & Latman, P.C.

(57) ABSTRACT

When two objects have overlapping without the intervention of another object, it is determined that the two objects are in contact with each other. Then, a second object, which reaches a state having overlapping with a first object and then reaches a state having overlapping again via a state without any overlapping during movement of the first object, is detected. When it is determined that the first and second objects are in contact with each other before and after the state without any overlapping, an information processing apparatus interchanges a hierarchical relation in Z-orders of the first and second objects.

9 Claims, 12 Drawing Sheets

F I G. 4A
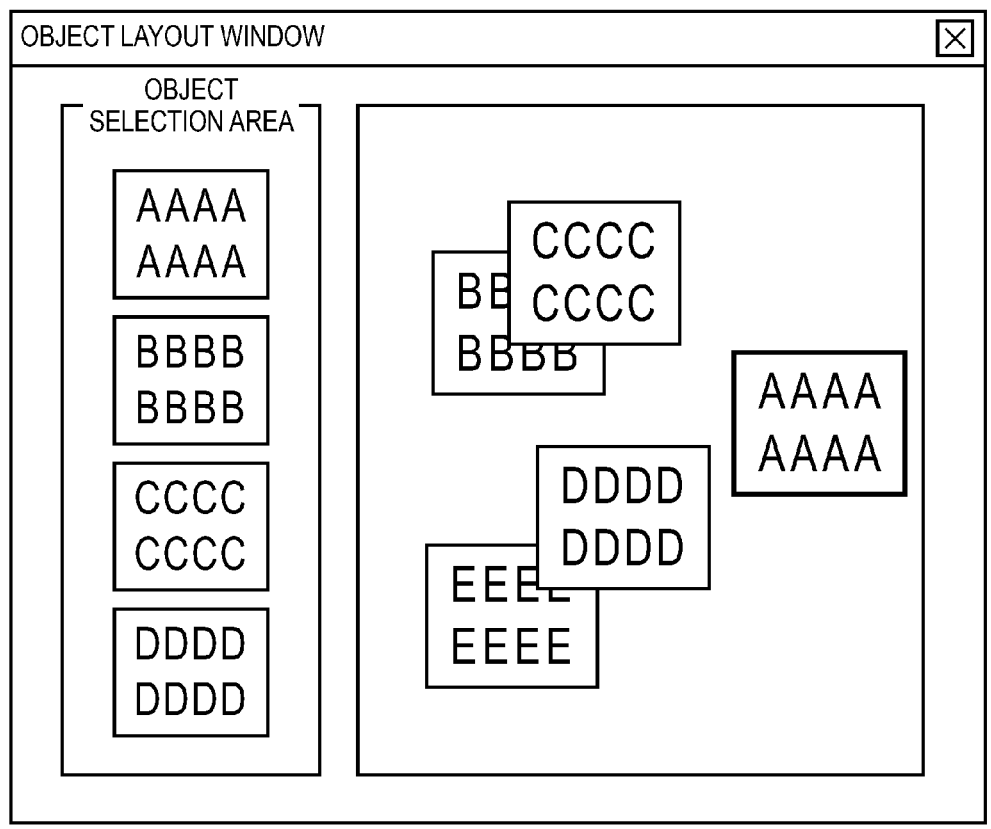
F I G. 4B
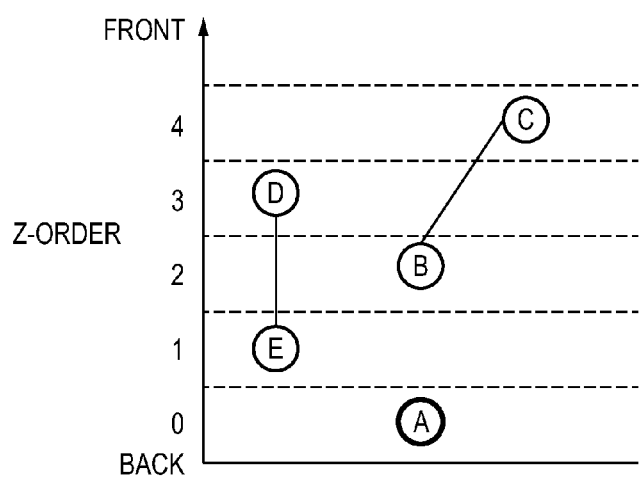

F I G. 6A
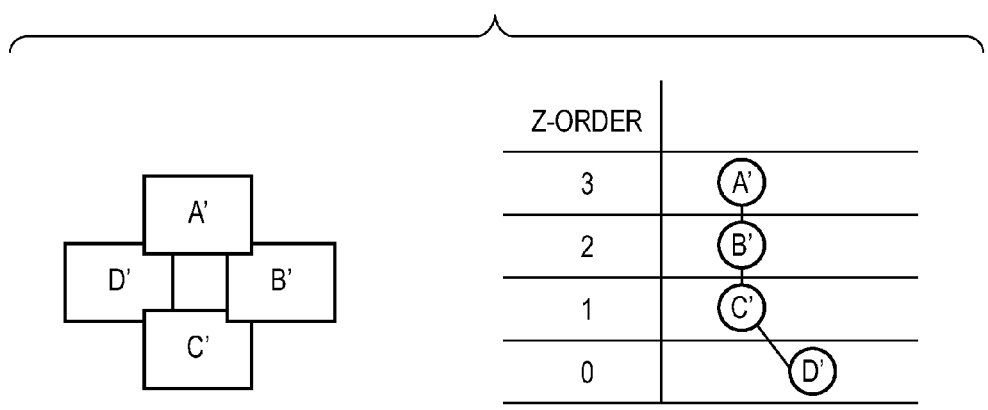
F I G. 6B
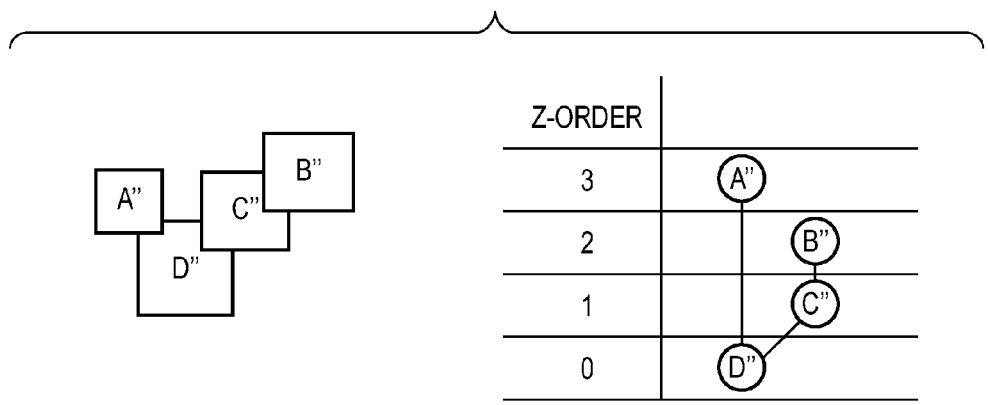

INFORMATION PROCESSING APPARATUS AND CONTROL METHOD THEREOF, AND RECORDING MEDIUM FOR CHANGING OVERLAP ORDER OF OBJECTS

BACKGROUND OF THE INVENTION

1. Field of the Invention

The present invention relates to a technique for laying out a plurality of objects to overlap each other, and changing an overlap order of the objects.

2. Description of the Related Art

Conventionally, when the user creates a document, a slide for a presentation, or the like using an application program installed in a personal computer, he or she lays out objects such as an icon, graphic, and image to overlap each other.

When a plurality of objects are laid out to overlap each other, the user often interchanges overlap orders (Z-orders) of the objects.

For example, a UI used to instruct to interchange Z-orders of objects is displayed in response to a user operation, and the user changes the Z-order to attain the desired overlap orders using the UI. The UI displays, for example, four commands "Bring to front", "Bring forward", "Send backward", and "Send to back", and the user changes the overlap orders of objects by repeating selection from these commands.

Also, a method of selecting and moving one of objects having overlapping to temporarily cancel overlapping, and moving that object to an original position to overlap the other object, thereby interchanging the hierarchical relation between the selected object and the other object has been disclosed (see Japanese Patent Laid-Open No. 2007-328029).

However, with the aforementioned method of Japanese Patent Laid-Open No. 2007-328029, even when another object having overlapping with two objects exists between the two objects having overlapping, Z-orders are changed. For this reason, an overlap relation which is not intended by the user is obtained.

For example, a case will be examined below wherein objects A, B, and C are laid out to overlap each other so as to have Z-orders in an order of C, B, and A from the front surface, and object C directly overlap objects A and B, respectively, as shown in FIG. 12A. At this time, object C is moved to cancel overlapping between objects A and C, but overlapping between objects B and C is maintained, as shown in FIG. 12B. After that, when object C is moved to the position in FIG. 12A to overlap object A, Z-orders are changed. After the Z-orders are changed, according to Japanese Patent Laid-Open No. 2007-328029, object C is controlled to underlap object A, thus obtaining an overlap relation shown in FIG. 12C.

At this time, in the state of FIG. 12B, although overlapping between objects C and B is not canceled, Z-orders of these two objects are also changed. Hence, a physically unnatural order change, which is not intended by the user, is made. That is, a change in overlap relation of objects, which is not intuitive for the user, occurs.

Even when the user moves object C to the position in FIG. 12B, and then moves object C to the original position to restore the state shown in FIG. 12A, the method of Japanese Patent Laid-Open No. 2007-328029 requires troublesome operations since the state of FIG. 12C has to be temporarily required.

SUMMARY OF THE INVENTION

The present invention has been made in consideration of the aforementioned conventional problems. The present invention provides an information processing apparatus, which allows the user to intuitively change an overlap relation of a plurality of laid-out objects, a control method thereof, and a recording medium.

The present invention in its first aspect provides an information processing apparatus comprising: a display unit configured to display a plurality of objects having different Z-orders on a predetermined field according to the Z-orders; a moving unit configured to move a first object of the plurality of objects within the field; a determination unit configured to determine, when two objects of the plurality of objects have overlapping without the intervention of another object, that the two objects are in contact with each other; a detection unit configured to detect a second object, which reaches a state having overlapping with the first object and then reaches a state having overlapping again via a state without any overlapping, of the plurality of objects during movement of the first object by the moving unit; and a Z-order interchange unit configured to interchange a hierarchical relation in Z-orders of the first object and the second object when the determination unit determines that the second object is in contact with the first object before and after the state without any overlapping, wherein the display unit displays the plurality of objects by reflecting interchanged Z-orders by the Z-order interchange unit during movement of the first object.

Further features of the present invention will become apparent from the following description of exemplary embodiments (with reference to the attached drawings).

BRIEF DESCRIPTION OF THE DRAWINGS

FIGS. 4A and 4B are views for explaining another operation example of object moving time processing according to the embodiment of the present invention;

FIGS. 6A and 6B are views for explaining definitions of touching objects according to the embodiment of the present invention;

DESCRIPTION OF THE EMBODIMENTS

A preferred embodiment of the present invention will be described in detail hereinafter with reference to the drawings. Note that one embodiment to be described below will explain an example in which the present invention is applied to a PC as an example of an information processing apparatus, which can display a plurality of objects movable by the user on a predetermined field to overlap each other. However, the present invention is applicable to an arbitrary apparatus which can display a plurality of objects movable by the user on a predetermined field according to their Z-orders. In the present specification, "Z-order" is information indicating a positional relationship of a plurality of objects in a direction (normal direction) perpendicular to a plane of a field on which the plurality of objects are laid out. Assume that the plurality of objects have different Z-orders.

Figure 1:
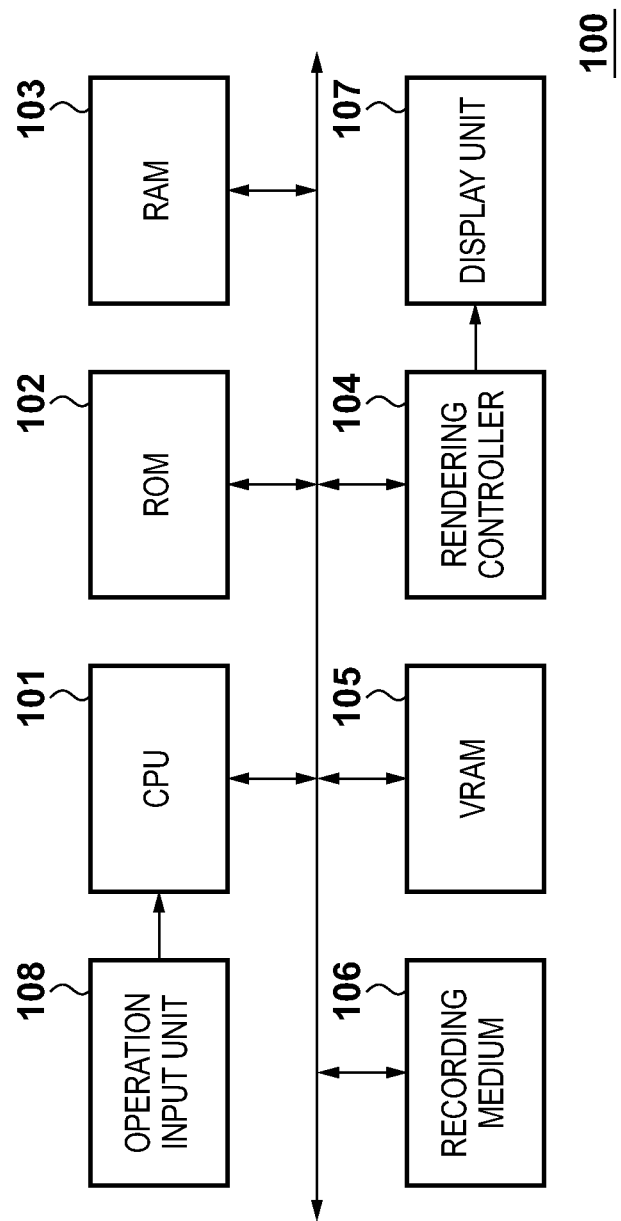
FIG. 1 is a block diagram showing the functional arrangement of a PC according to an embodiment of the present invention.

FIG. 1 is a block diagram showing the functional arrangement of a PC 100 according to an embodiment of the present invention.

A CPU 101 is a block, which controls operations of respective blocks included in the PC 100. In this embodiment, assume that a program associated with an application (image layout application), which allows the user to lay out a plurality of objects and to change Z-orders of the objects, as will be described later, is recorded on, for example, a recording medium 106. The CPU 101 reads out the program associated with the application from the recording medium 106 (to be described later), expands the program on a RAM 103, and executes the expanded program, thereby controlling the operations of the respective blocks included in the PC 100.

A ROM 102 is a rewritable nonvolatile memory, and is, for example, a storage area which stores control programs of the respective blocks included in the PC 100, and information for setting parameters required for the operations of the respective blocks and the like. The RAM 103 is a volatile memory, and is used not only as an expansion area of the aforementioned program associated with the application but also as a temporary storage area of intermediate data output during the operations of the respective blocks and the like.

A rendering controller 104 controls to generate a display image to be displayed on a display unit 107 (to be described later) and to output the display image to the display unit 107. The rendering controller 104 reads out objects such as GUI data stored in the ROM 102 or recording medium 106 and renders them to be laid out at predetermined positions in a VRAM 105 which stores an image to be displayed, under the control of the CPU 101. The VRAM 105 is a storage area for rendering, which stores a display image. In this embodiment, on the VRAM 105, a plurality of objects are superimposed according to their Z-orders, thereby generating a display image.

The recording medium 106 is a recording device such as an HDD or memory card, which is detachably attached to the PC 100, and records the program associated with the application used to lay out a plurality of objects to allow to change their Z-orders, objects to be laid out, and the like. Note that the following description will be given under the assumption that the program of the application and objects to be laid out are recorded in the recording medium 106. However, the present invention is not limited to such specific embodiment. It is readily anticipated by those skilled in the art that the program and objects may be acquired from a server on a network such as the Internet via a network interface (not shown).

The display unit 107 is, for example, a display device such as a liquid crystal monitor. In the description of this embodiment, the display unit 107 is integrated in the PC 100. However, the present invention is not limited to such specific embodiment, and the display unit 107 may be an external display device connected to the PC 100.

An operation input unit 108 is, for example, a user interface such as a mouse and keyboard, which are connected to the PC 100. The operation input unit 108 accepts a user operation, and transfers a control signal corresponding to the operation to the CPU 101. In this embodiment, assume that the user selects and drags (moves) an object laid out in a display image using a mouse to change its Z-order while browsing the display image displayed on the display unit 107.

Note that in the description of this embodiment, Z-orders of objects are changed by a mouse operation. However, the present invention is not limited to such specific embodiment, and such operation may be attained by a keyboard operation or according to an output from a touch sensor when the display unit 107 is a touch screen having the touch sensor.

Note that the touch screen is an input device, which is two-dimensionally configured to be overlaid on the display unit 107, and outputs coordinate information according to a touched position. When the operation input unit 108 includes the touch screen, the CPU 101 can detect the following operations on the touch screen: an operation for touching the touch screen with the finger or a pen (to be referred to as a touch-down operation hereinafter), a state in which the touch screen is kept touched by the finger or pen (to be referred to as a touch-on state hereinafter), an operation for moving the finger or pen kept touched on the touch screen (to be referred to as a move operation hereinafter), an operation for releasing the finger or pen touched on the touch screen (to be referred to as a touch-up operation hereinafter), and a state in which the touch screen is touched with nothing (to be referred to as a touch-off state hereinafter). The CPU 101 is notified of these operations and position coordinates where the touch screen is touched with the finger or pen, and determines the operation made on the touch screen based on the notified information. As for a move operation, a moving direction of the finger or pen which is moved on the touch screen can also be determined for respective vertical and horizontal components on the touch screen based on changes of position coordinates. When a touch-up operation is made via a move operation of a predetermined distance or more from a touch-down position on the touch screen, such operations are interpreted that a drop operation is made via a drag operation (drag and drop). The touch screen may adopt any of those of various systems such as a resistive film system, capacitance system, surface acoustic wave system, infrared system, electromagnetic induction system, image recognition system, and optical sensor system.

Note that this embodiment will exemplify the case in which the present invention is applied to the PC. However, the present invention is not limited to this. That is, the present invention may be applied to an image capturing apparatus such as a digital camera. More specifically, the present invention is applicable to a case in which a captured image, which is recorded in a recording medium such as a memory card, which can be read by the digital camera, is played back and displayed on a display such as a rear liquid crystal device included in the digital camera. Furthermore, the present invention is also applicable to apparatuses such as a PDA, mobile phone, portable image viewer, printer having a display, digital photo frame, music player, game machine, and digital book reader, which can display objects such as an image, text, illustration, and graphic.

<Application GUI>

Figure 2A:
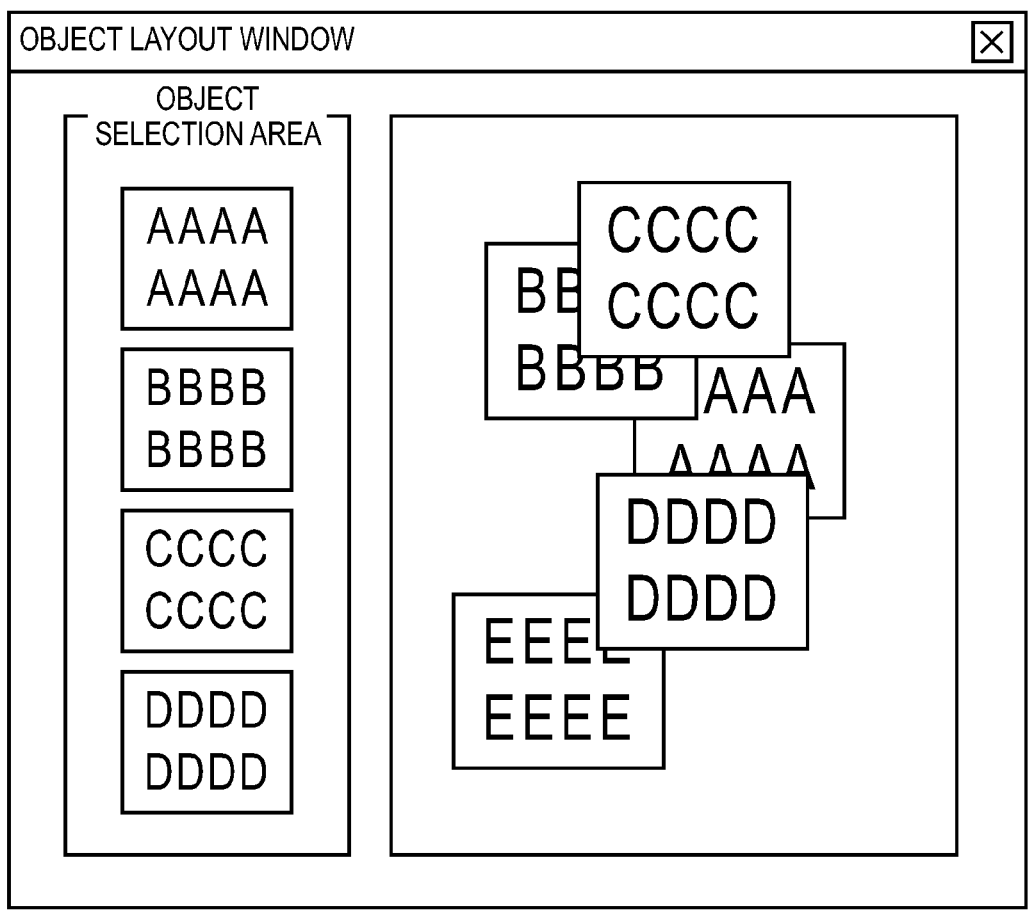
FIGS. 2A and 2B are views for explaining a GUI on which objects having different Z-orders are laid out according to the embodiment of the present invention.

FIG. 2A exemplifies a window of the image layout application in this embodiment. In this embodiment, the CPU 101 launches that application in response to a user instruction, allows the user to lay out image data recorded in the recording medium 106 in a field of the window by drag & drop operations, and manages the layout. To a plurality of image data, different Z-order values are assigned in a layout order on the window. Assume that image data having a smaller Z-order is laid out backward, and that having a larger Z-order is laid out forward.

Note that in the description of this embodiment, image data are used as objects to be laid out on the field. However, the present invention is not limited to such specific embodiment, and for example, graphics, tables, character strings, and the like may be used.

<Outline of Operation>

Figure 3A:
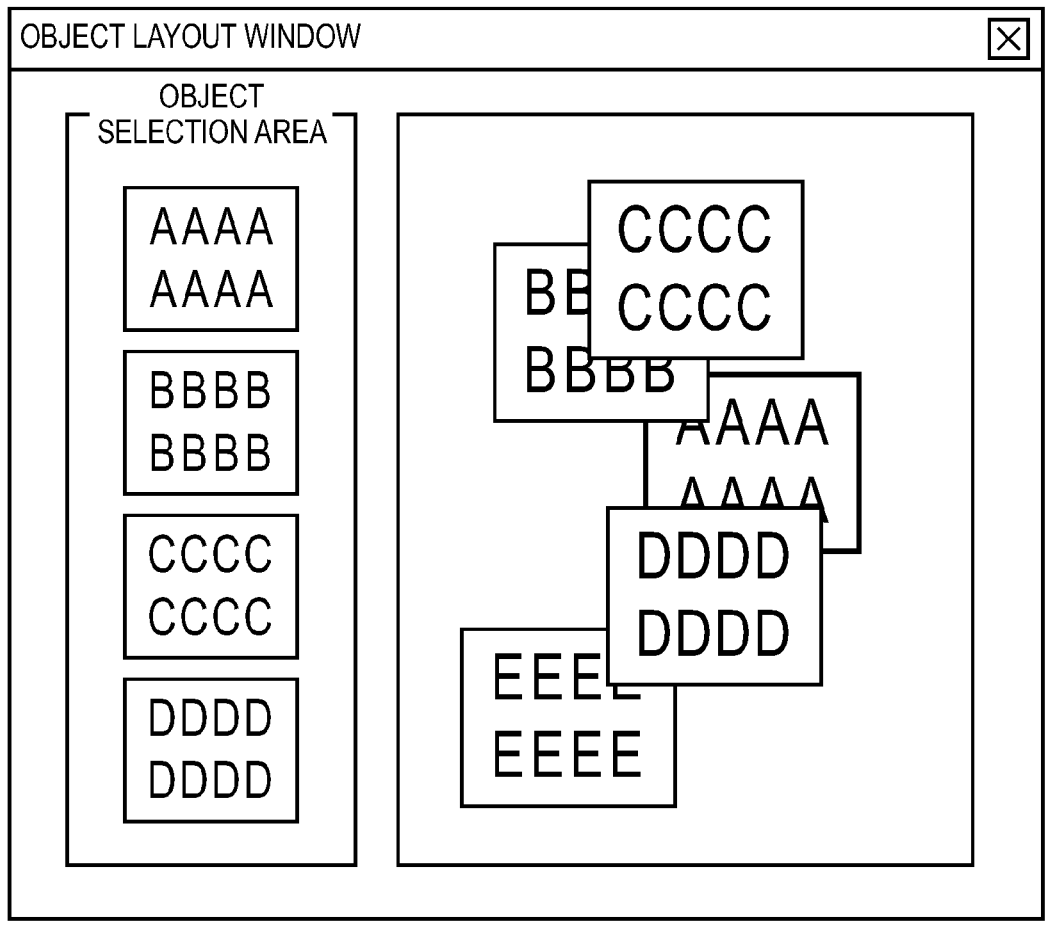
FIGS. 3A and 3B are views for explaining an operation example of object moving time processing according to the embodiment of the present invention.
Figure 3B:
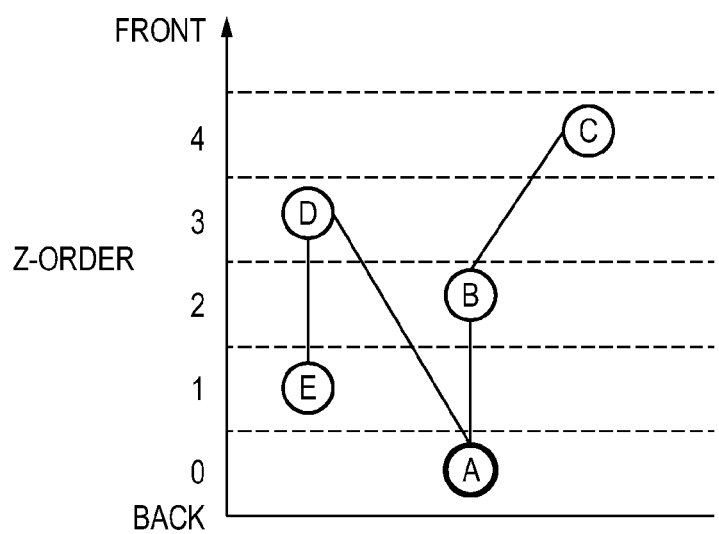
Figure 12A:
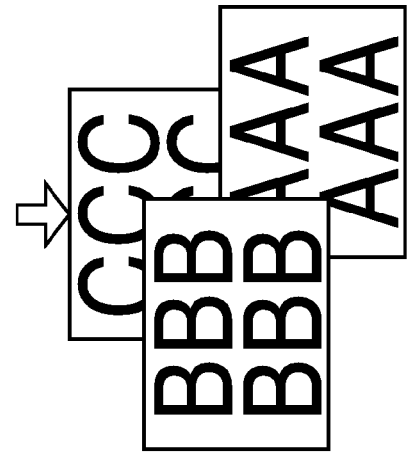
FIGS. 12A, 12B, and 12C are views for explaining problems of the related art.
Figure 12B:
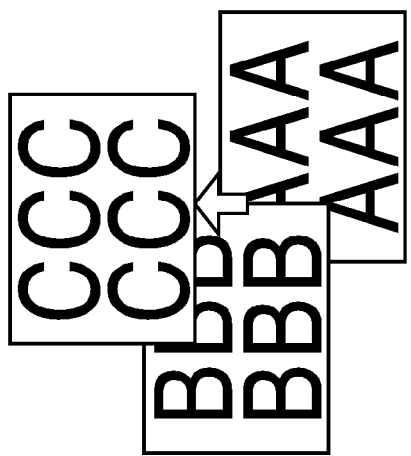
Figure 12C:
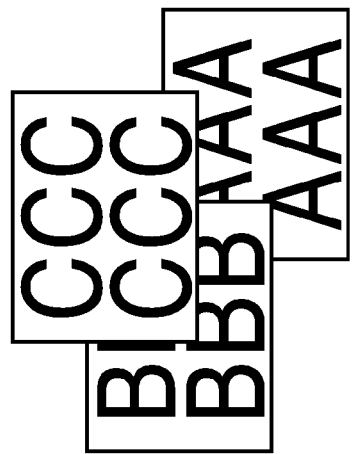

In this embodiment, a case will be described below wherein object A having overlapping with objects B and C is selected while objects A to E are laid out, as shown in FIG. 2A. Then, assume that object A is moved downward in the longitudinal direction of the window, and reaches a state without overlapping between objects A and C while holding overlapping between objects A and B, as shown in FIG. 3A. After that, object A is moved upward in the longitudinal direction of the window to the original position, and overlaps object C, thus returning to the state shown in FIG. 2A. That is, in this case, according to this embodiment, objects A and C maintain their original Z-orders, and Z-orders of objects A and C are never interchanged like in the related art shown in FIGS. 12A to 12C.

Figure 5A:
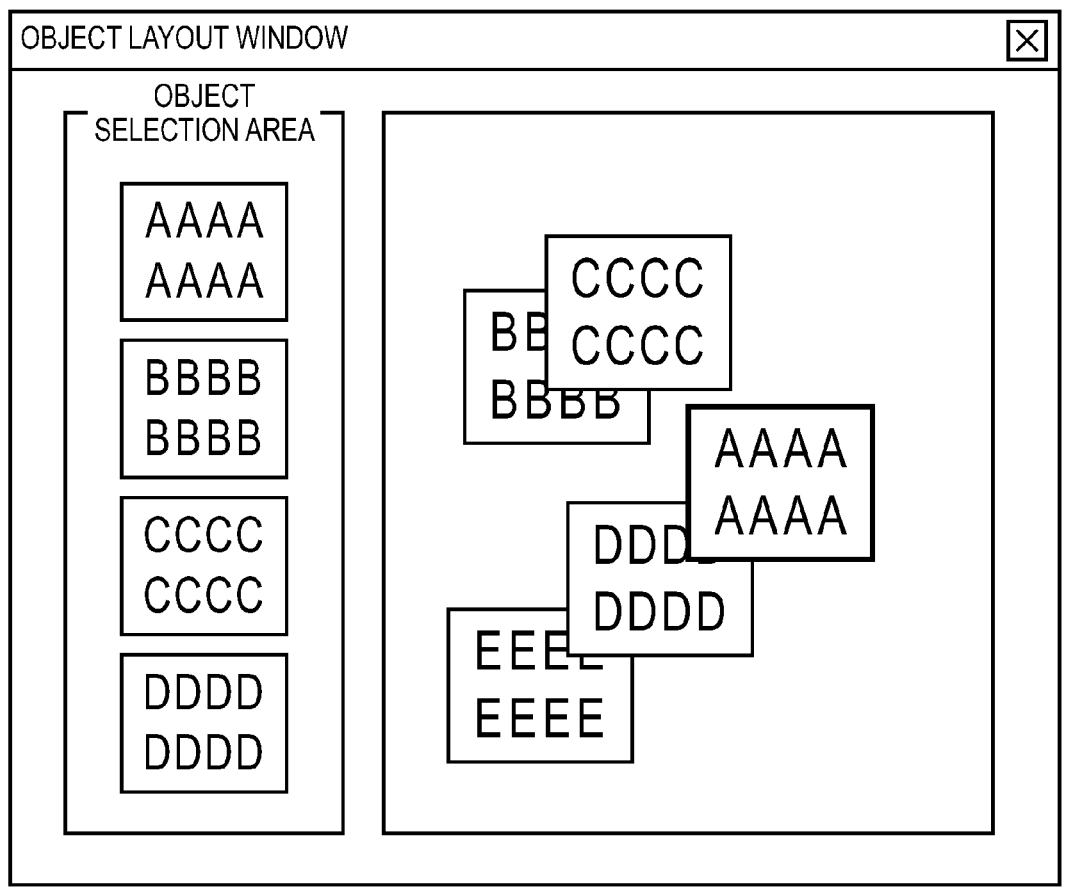
FIGS. 5A and 5B are views for explaining still another operation example of object moving time processing according to the embodiment of the present invention.
Figure 5B:
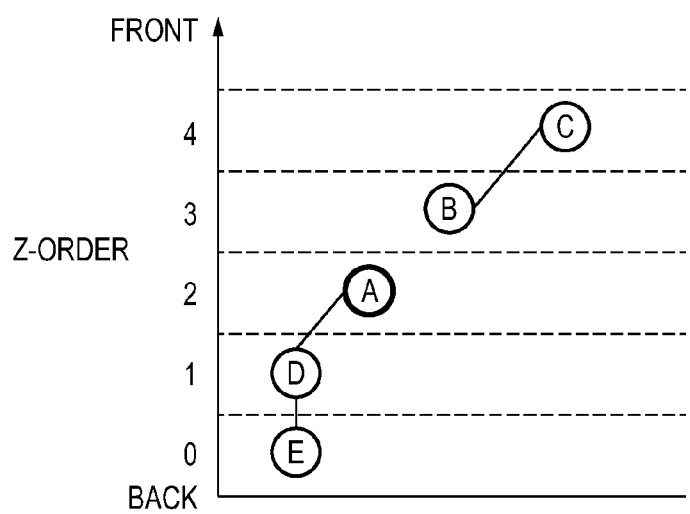
Figure 7:
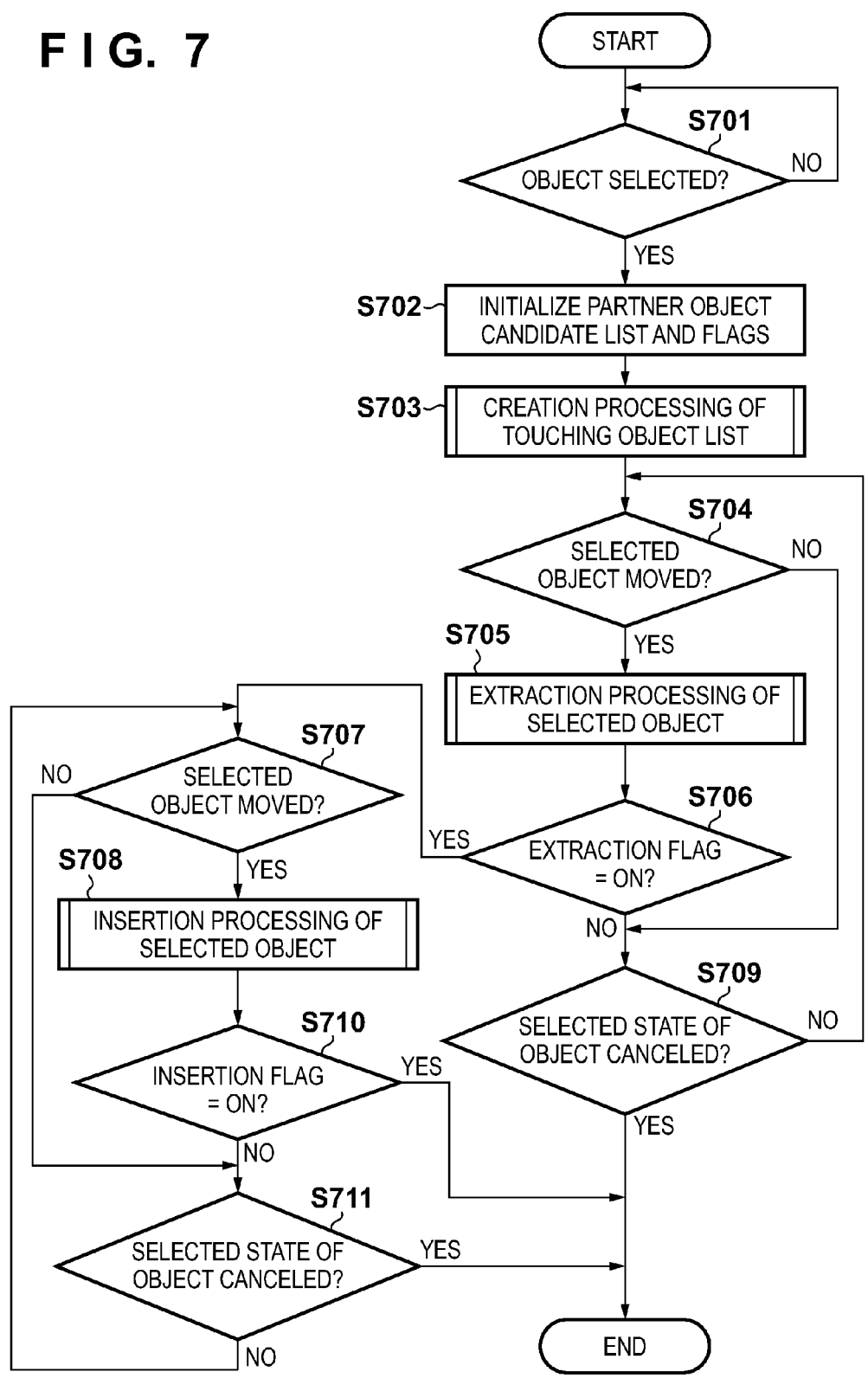
FIG. 7 is a flowchart of the object moving time processing according to the embodiment of the present invention.

Next, in this embodiment, a case will be described below wherein object A is further moved from the state shown in FIG. 3A to the right in the horizontal direction of the window, and reaches a state in which object A does not overlap any object, as shown in FIG. 4A. After that, object A is moved to the left in the horizontal direction of the window to overlap object D, thus interchanging Z-orders of objects A and D, as shown in FIG. 5A. In tis case, Z-orders of objects B and C are corrected, so that a hierarchical relation among objects A, B, and C remains unchanged. Also, a Z-order of object E is corrected, so that a hierarchical relation between objects D and E remains unchanged.

<Z-order Management of Object>

Figure 2B:
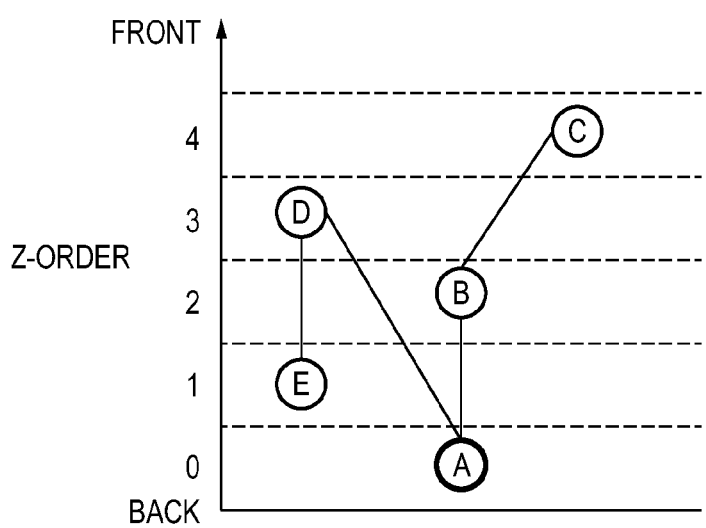

An "overlap graph" shown in FIG. 2B, which is used to manage Z-orders of a plurality of image data laid out by the image layout application in this embodiment, will be described below. Note that the overlap graph shown in FIG. 2B manages Z-orders of the plurality of image data shown in FIG. 2A.

The overlap graph manages information associated with an object as a node for each Z-order value. In this embodiment, assume that as a Z-order has a smaller value, an object exists at a more backward location. When two objects are laid out to overlap each other, an object having a larger Z-order overlaps the other object. For the plurality of laid-out objects, serial natural numbers in their overlapping order are assigned as Z-order values. As shown in the example of FIG. 2B, objects E, D, A, B, and C are laid out in turn from the back surface on the window shown in FIG. 2A, and Z-order values ranging from 0 to 4 are respectively assigned.

The overlap graph expresses touching objects to be defined below by connecting nodes of the corresponding objects via a line segment. In the example of FIG. 2A, object A is in contact with objects B and D, respectively, and nodes of objects B and D and that of object A are connected via line segments. Also, object B is further in contact with object C, and a node of object C and that of object B are connected via a line segment. Furthermore, object D is further in contact with object E, and a node of object E and that of object D are connected via a line segment.

<Touching Objects>

(Definition of Touching Object)

In this embodiment, as for one object of interest, of objects having overlapping with the object of interest, an object which directly overlaps the object of interest is defined as a touching object. More specifically, the touching object indicates that which does not have any overlapping (indirect overlapping) via another object which exists in a Z-order between the object of interest and touching object.

For example, when objects A' to D' are laid out, as shown in FIG. 6A, objects A' and D' have overlapping. However, in consideration of objects B' and C' which exist in Z-orders between objects A' and D', objects A and B', objects B' and C', and objects C' and D' have overlapping. In such case, indirect overlapping exists between objects A' and D', and it is judged that object D' does not correspond to a touching object of object A'.

By contrast, a case will be examined below wherein objects A" to D" are laid out, as shown in FIG. 6B. At this time, objects B" and C", which exist in Z-orders between objects A" and D", have overlapping, but they do not have any overlapping with object A". Therefore, indirect overlapping does not exist between objects A" and D". That is, since direct overlapping exists between objects A" and D", it is judged that object D" corresponds to a touching object of object A".

Therefore, in the example of FIG. 2A, when object A is selected as an object of interest, touching objects are objects B and D. However, although objects A and C have overlapping, object B exists in a Z-order between objects A and C, and object B has overlapping with object A. Therefore, object C is not a touching object of object A.

In this embodiment, of touching objects, an object which overlaps the front surface of the object of interest, that is, an object which has a larger Z-order value, is further defined as a front touching object. Also, of touching objects, an object which underlaps the back surface of the object of interest, that is, an object which has a smaller Z-order value, is defined as a back touching object. In the example of FIG. 2A, objects B and D are front touching objects of object A.

(Definition of Series Object)

In this embodiment, all objects, which overlap as touching objects in turn from the object of interest in a front or back surface direction, are defined as front series objects or back series objects. Note that front and back series objects are defined as series objects as a whole.

For example, a case will be examined wherein objects A to E are laid out, as shown in FIG. 2A, and object A is selected as an object of interest. At this time, a front touching object of object A is object B, front touching object of object B is object C, and a front touching object of object C does not exist. Therefore, front series objects of object A are objects B and C. Likewise, as for back series objects, since a back touching object of object A does not exist, object A does not have back series objects. On the other hand, objects A" to D" are laid out, as shown in FIG. 6B, and object B" is selected as an object of interest. In this case, a back touching object of object B" is object C", a back touching object of object C" is object D", and a back touching object of object D" does not exist. Therefore, back series objects of object B" are objects C" and D".

<Object Moving Time Processing>

Specific processes of object moving time processing of the PC 100 of this embodiment with the aforementioned arrangement will be described below using the flowcharts shown in FIGS. 7 to 13. Processing corresponding to each flowchart is implemented when the CPU 101 reads out a corresponding processing program stored in, for example, the recording medium 106, expands the readout program on the RAM 103, and executes the expanded program.

Note that the following description will be given under the assumption that this object moving time processing is started when, for example, the user selects one of objects laid out on the window by operating the mouse, and is repetitively executed during selection of the object. In the following description of the object moving time processing, an object which is selected and moved by user operations will be explained as an "object of interest".

The CPU 101 determines whether or not one of objects laid out on the window is selected (S701). If the object is selected (Yes in S701), the CPU 101 initializes a partner object candidate list, extraction flag, and insertion flag (S702), and executes touching object list creation processing for all the objects laid out on the window (S703). Then, the CPU 101 determines whether or not the object of interest has been moved (S704). If the object of interest has been moved (Yes in S704), the CPU 101 executes extraction processing of the object of interest (S705). After that, if the extraction flag has been updated from OFF as an initial value to ON (Yes in S706), the CPU 101 determines whether or not the object of interest has been further moved (S707). If the object of interest has been moved (Yes in S707), the CPU 101 executes insertion processing of the object of interest (S708).

If the object of interest has not been moved (No in S704) or if the extraction flag is OFF even after the extraction processing of the object of interest (No in S706), the CPU 101 determines whether or not the selected state of the object of interest is canceled (S709). If the selected state is maintained (No in S709), the CPU 101 returns the process to step S704; if the selected state is canceled (Yes in S709), the CPU 101 ends this processing without interchanging Z-orders of the object of interest and a partner object.

Also, if the object of interest has not been moved (No in S707) or if the insertion flag is OFF even after the insertion processing of the object of interest (No in S710), the CPU 101 determines whether or not the selected state of the object of interest is canceled (S711). If the selected state is maintained (No in S711), the CPU 101 returns the process to step S707 to execute processing; if the selected state is canceled (Yes in S711), the CPU 101 ends this processing without interchanging Z-orders of the object of interest and a partner object.

(S703: Touching Object List Creation Processing)

Figure 8:
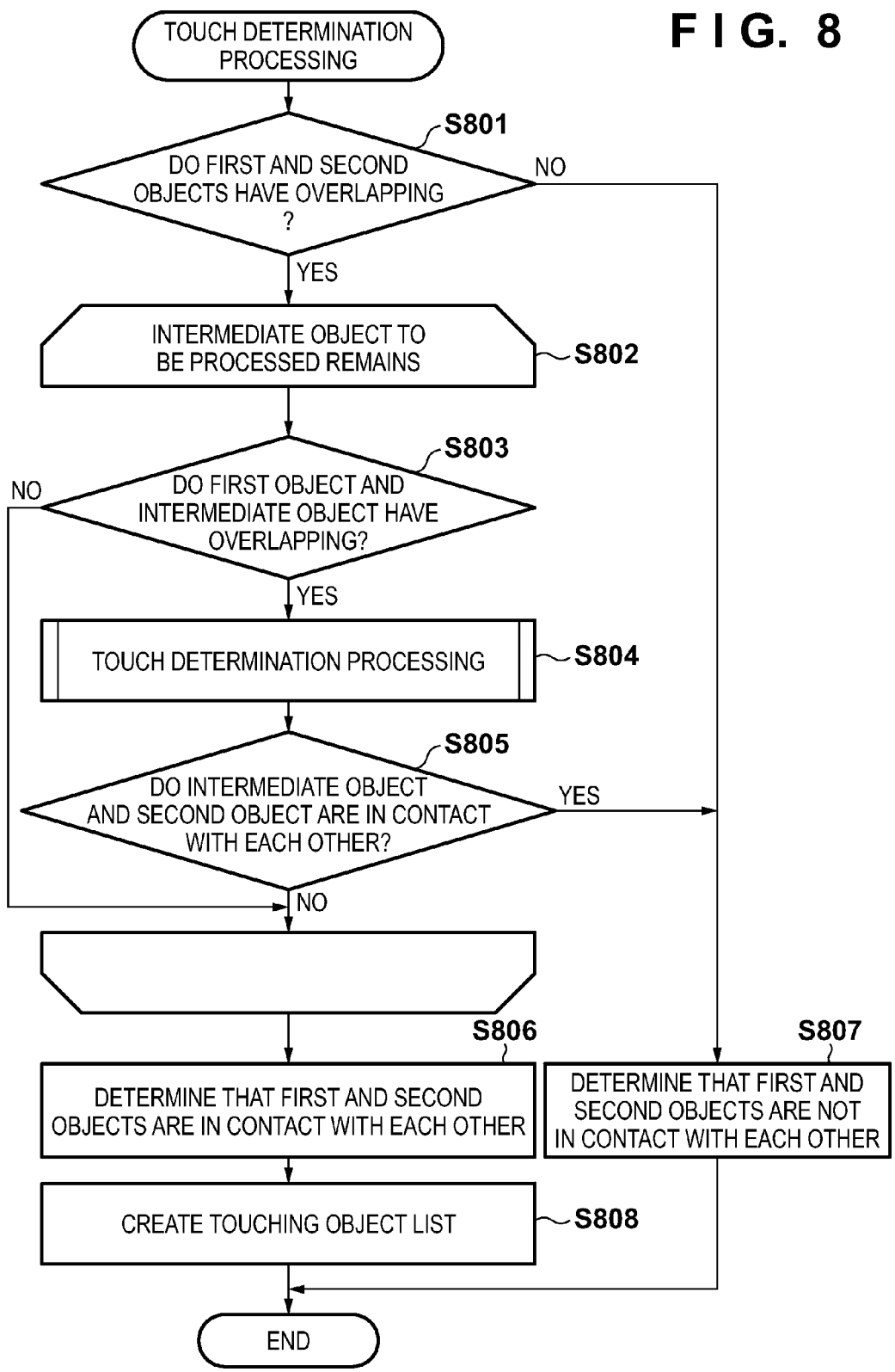
FIG. 8 is a flowchart of touch determination processing according to the embodiment of the present invention.

Specific processing of touch determination processing required to determine whether or not first and second objects, which are laid out on the window of the application, are in contact with each other will be described below with reference to the flowchart shown in FIG. 8. The processing corresponding to this flowchart can be implemented when the CPU 101 reads out a corresponding processing program stored in, for example, the recording medium 106, expands the readout program on the RAM 103, and executes the expanded program.

The CPU 101 judges in step S801 whether or not the laid-out first and second objects have overlapping. More specifically, the CPU 101 acquires information such as layout coordinates and object sizes of the first and second objects, and judges whether or not a region where the laid-out first and second objects are displayed to overlap each other, exists. In this case, when the first or second object is not a rectangle but a curve, the presence/absence of overlapping may be judged using a rectangular region which surrounds these objects. Alternatively, the presence/absence of overlapping may be judged using a region larger or smaller by a predetermined ratio than an actual display region of the first or second object in consideration of actual appearance of the objects on the screen for the user and the size of an operation member such as a cursor or finger used by the user. If the CPU 101 judges that the first and second objects have overlapping, then advances the process to step S802; otherwise, the CPU 101 advances the process to step S807.

When the first and second objects have overlapping, the CPU 101 executes loop processing from step S802 to step S805 for all objects (intermediate objects) which exist in Z-orders between the first and second objects. For this purpose, if an intermediate object for which the loop processing is to be executed still remains in step S802, the CPU 101 executes the loop processing; if the loop processing for all the intermediate objects is complete, the CPU 101 advances the process to step S806.

The CPU 101 judges in step S803 whether or not one selected intermediate object and the first object have overlapping. The process of this step is the same as that executed for the first and second objects in step S801, and a description thereof will not be repeated. If the CPU 101 judges that the selected intermediate object and first object have overlapping, then advances the process to step S804. If the CPU 101 judges that the selected intermediate object and first object do not overlap, it ends the loop processing for that intermediate object, and executes the loop processing for the next intermediate object.

In step S804, the CPU 101 executes this touch determination processing for the selected intermediate object and the second object. That is, in this step, since indirect overlapping may exist between the first and second objects via the selected intermediate object or that intermediate object and another intermediate object, recursive processing is executed.

The CPU 101 determines in step S805 whether or not the selected intermediate object and the second object are in contact with each other. More specifically, as a result of the touch determination processing for the selected intermediate object and second object, which is executed in step S804, the CPU 101 judges whether or not they are in contact with each other.

In this step, since the recursive processing is executed for the intermediate objects, which exist in Z-orders between the first and second objects, whether or not an object which is in contact with the second object exists at a destination by tracing objects having overlapping can be judged. That is, if an object which is in contact with the second object finally exists at a destination by tracing objects having overlapping, this means that indirect overlapping exists.

If the CPU 101 judges that the selected intermediate object and second object are in contact with each other, then advances the process to step S807. On the other hand, if the CPU 101 judges that the selected intermediate object and second object are not in contact with each other, it ends the loop processing for that intermediate object, and executes the loop processing for the next intermediate object.

Upon completion of execution of the loop processing for all the intermediate objects which exist in Z-orders between the first and second objects, the CPU 101 judges in step S806 that the first and second objects are in contact with each other. Then, the CPU 101 outputs information associated with the second object to a touching object list of the first object (S808), thus ending this touch determination processing. In this case, when a Z-order value of the second object is smaller than that of the first object, information indicating that the second object is a back touching object is also output. On the other hand, when the Z-order value of the second object is larger than that of the first object, information indicating that the second object is a front touching object is also output.

In step S807, the CPU 101 judges that the first and second objects are not in contact with each other, and outputs a determination result indicating that they are not in contact with each other, thus ending this touch determination processing.

(S705: Extraction Processing of Object of Interest)

Figure 9:
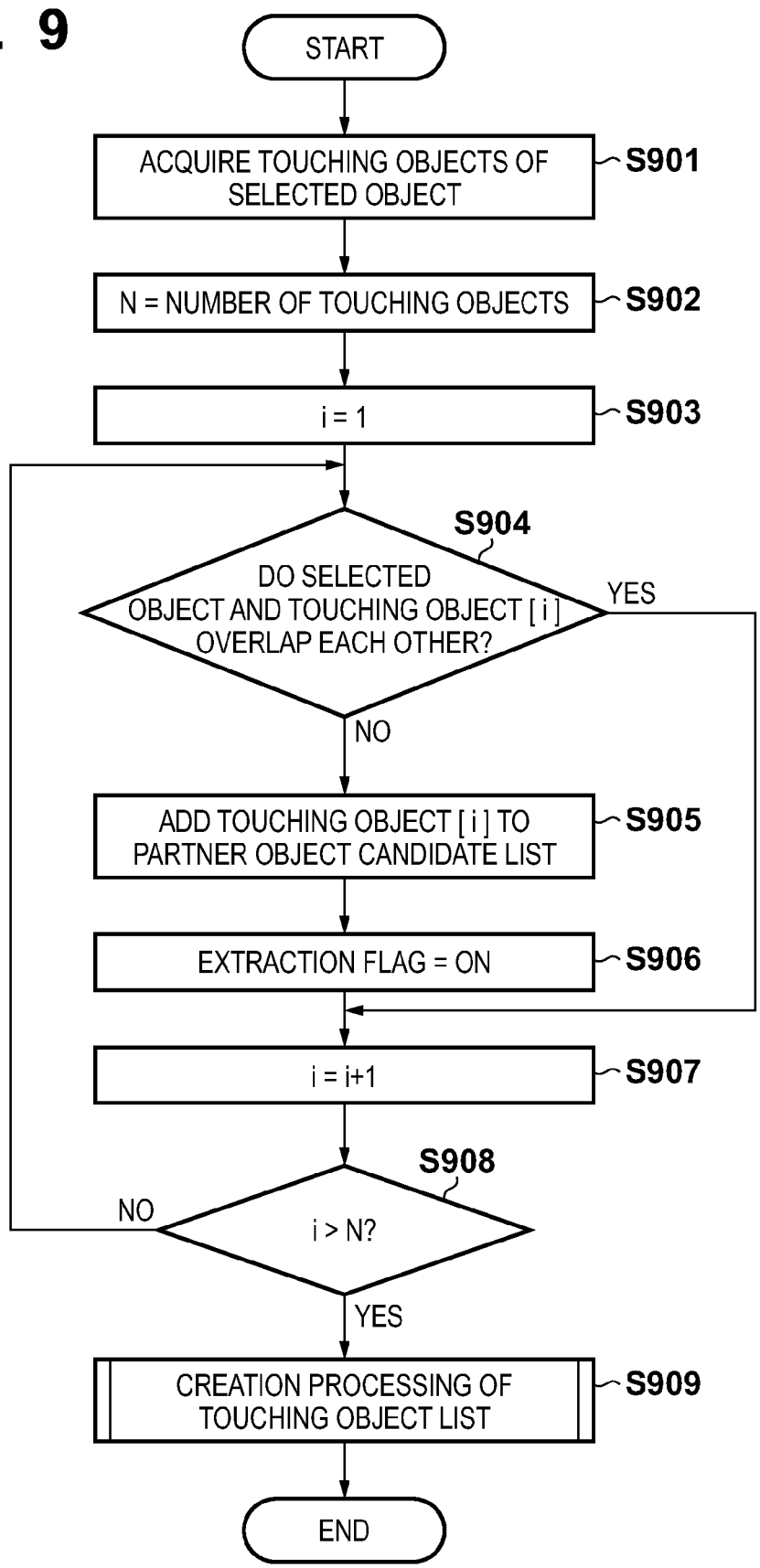
FIG. 9 is a flowchart of object extraction processing according to the embodiment of the present invention.

Specific processing of the extraction processing executed when the object of interest is moved to cancel overlapping with its touching objects will be described below with reference to the flowchart shown in FIG. 9. The processing corresponding to this flowchart can be implemented when the CPU 101 reads out a corresponding processing program stored in, for example, the recording medium 106, expands the readout program on the RAM 103, and executes the expanded program.

The CPU 101 acquires information associated with touching objects of the object of interest from the touching object list (S901), substitutes the number of touching objects in N (S902), and initializes counter i to substitute "1" in i (S903). Then, the CPU 101 determines whether or not the object of interest remains overlapping with an i-th touching object (S904). If the object of interest remains overlapping with the i-th touching object (Yes in S904), then advances the process to step S907. On the other hand, if the object of interest does not overlap the i-th touching object (No in S904), the CPU 101 adds information associated with the i-th touching object in a partner object candidate list (S905). Then, the CPU 101 updates the extraction flag from an initial value "OFF" to "ON" (S906), and increments counter i by "1" (S907). If the value of counter i is not larger than the number of touching objects (No in S908), the CPU 101 returns the process to step S904, and the CPU 101 repeats the same processing for the next touching object. If the value of counter i is larger than the number N of touching objects (Yes in S908), the CPU 101 executes creation processing of a touching object list for all objects laid out on the window (S909) as in the above description.

(S708: Insertion Processing of Object of Interest)

Figure 10:
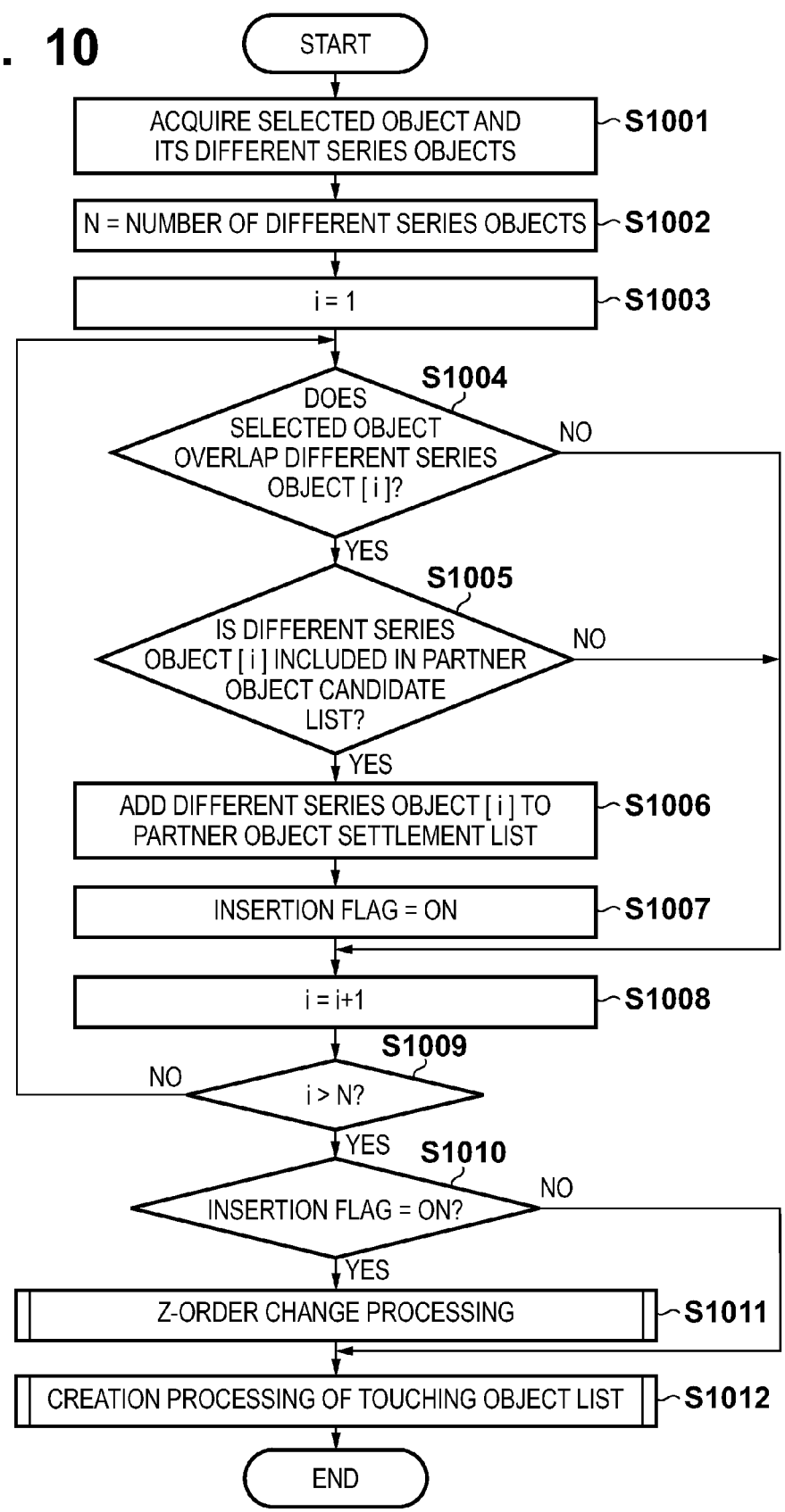
FIG. 10 is a flowchart of object insertion processing according to the embodiment of the present invention.

Specific processing of the insertion processing executed when the object of interest is moved to cancel overlapping with its touching objects, and overlaps the touching objects again will be described below with reference to the flowchart shown in FIG. 10. The processing corresponding to this flowchart can be implemented when the CPU 101 reads out a corresponding processing program stored in, for example, the recording medium 106, expands the readout program on the RAM 103, and executes the expanded program.

The CPU 101 acquires objects which are not series objects of the object of interest (to be referred to as different series objects hereinafter) from the objects laid out on the window with reference to the touching object list (S1001), substitutes the number of different series objects in N (S1002), and initializes counter i to substitute "1" in i (S1003). Then, the CPU 101 determines whether or not the object of interest overlaps an i-th different series object (S1004). If the object of interest does not overlap the i-th different series object (No in S1004), the CPU 101 advances the process to step S1008. If the object of interest overlaps the i-th different series object (Yes in S1004), the CPU 101 determines whether or not the i-th different series object is included in the partner object candidate list (S1005). If the i-th different series object is not included in the partner object candidate list, the CPU 101 advances the process to step S1008. On the other hand, if the i-th different series object is included in the partner object candidate list (Yes in S1005), the CPU 101 adds information associated with the i-th different series object to a partner object settlement list (S1006). Then, the CPU 101 updates the insertion flag from an initial value "OFF" to "ON" (S1007), and increments counter i by "1" (S1008). If the value of counter i is not larger than the number of different series objects (No in S1009), the CPU 101 returns the process to step S1004, and the CPU 101 repeats the same processing for the next different series object. If the value of counter i is larger than the number N of different series objects (Yes in S1009), and the insertion flag is ON, the CPU 101 executes Z-order change processing (S1011). The CPU 101 executes the creation processing of a touching object list for all objects laid out on the window (S1012) as in the above description.

(S1011: Z-order Change Processing)

Figure 11:
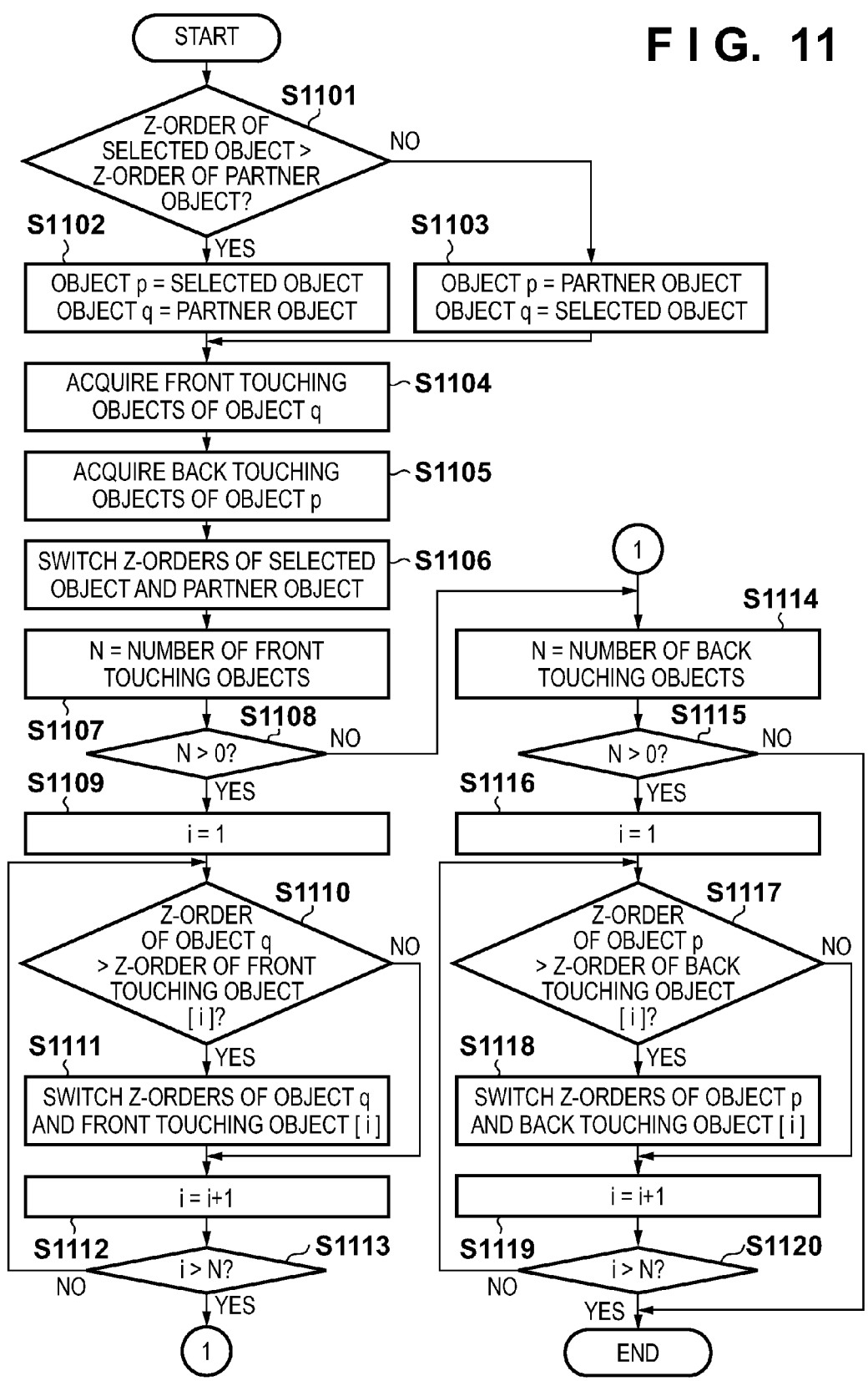
FIG. 11 is a flowchart of Z-order change processing according to the embodiment of the present invention.

Specific processing of the Z-order change processing executed when overlap orders of the object of interest and a partner object are to be changed will be described below with reference to the flowchart shown in FIG. 11. The processing corresponding to this flowchart can be implemented when the CPU 101 reads out a corresponding processing program stored in, for example, the recording medium 106, expands the readout program on the RAM 103, and executes the expanded program.

The CPU 101 compares Z-orders of the object of interest and partner object (S1101). If the Z-order of the object of interest is larger (Yes in S1101), the CPU 101 sets the object of interest as object p and the partner object as object q (S1102). On the other hand, if the Z-order of the object of interest is smaller (No in S1101), the CPU 101 sets the partner object as object p and the object of interest as object q (S1103). That is, an object, which has a larger Z-order and overlaps the other object, is set as object p. With reference to the touching object list, the CPU 101 acquires front touching objects of object q (S1104) and back touching objects of object p (S1105). Then, the CPU 101 switches the Z-orders of objects p and q (S1106). The CPU 101 substitutes the number of front touching objects of object q in N (S1107), and determines whether or not N is larger than 0 (S1108). Note that touching objects other than the partner object are acquired in steps S1104 and S1105.

If N is larger than 0 (Yes in S1108), the CPU 101 substitutes "1" in i (S1109), and compares Z-orders of object q and its front touching object [i] (S1110). If the Z-order of object q is larger (Yes in S1110), the CPU 101 switches the Z-orders of object q and front touching object [i] (S1111). Then, the CPU 101 increments i by "1" (S1112) and determines whether or not i is larger than N (S1113). If i is not larger than N (No in S1113), the CPU 101 returns the process to step S1110; if i is larger than N (Yes in S1113), the CPU 101 advances the process to step S1114 and the CPU 101 executes respective processes.

That is, even when the Z-order of object q is interchanged with respect to that of object p, a hierarchical relation with front touching objects other than object p with respect to object q is left unchanged.

Next, the CPU 101 substitutes the number of back touching objects of object p in N (S1114), and determines whether or not N is larger than 0 (S1115).

If N is larger than 0 (Yes in S1115), the CPU 101 substitutes "1" in i (S1116), and compares Z-orders of object p and back touching object [i] (S1117). If the Z-order of object p is smaller (Yes in S1117), the CPU 101 switches the Z-orders of object p and back touching object [i] (S1118). Then, the CPU 101 increments i by "1" (S1119), and determines whether or not i is larger N (S1120). If i is not larger than N (No in S1120), the CPU 101 returns the process to step S1117 and then executes processing; if i is larger than N (Yes in S1120), the CPU 101 ends the processing.

That is, even when the Z-order of object p is interchanged with respect to that of object q, a hierarchical relation with back touching objects other than object q with respect to object p is maintained. On the other hand, if the Z-order of object p is larger, this processing ends.

In this manner, Z-orders of the object of interest and partner object can be interchanged while maintaining a hierarchical relation between the object of interest and other objects. Also, this embodiment can present an intuitive operation result, which reflects physically natural interchange operations, to the user.

Note that in this embodiment, when Z-orders of the object of interest and partner object are interchanged, the partner object candidate list may be initialized. Alternatively, by holding the partner object candidate list without initializing it, Z-orders may be continuously interchanged with touching objects.

Note that in the aforementioned Z-order interchange processing, the Z-orders of the object of interest and partner object are interchanged. The present invention is not limited to such specific embodiment as long as a hierarchical relation between the object of interest and partner object need only be reversed. For example, when the object of interest was in contact with the front surface of the partner object, a Z-order lower by one of that of the partner object may be added, and that Z-order may be assigned to the object of interest. That is, the Z-order value of one object may be changed to assume a value immediately above or below that of the other touching object. In this way, since at least an overlap relation between the partner object and front touching object can be maintained, Z-order matching processing need only be executed for back touching objects of the first object.

As described above, since an overlap relation with other objects can be maintained even when Z-orders of two objects are interchanged, an operation method which is natural, intuitive, and easy to understand, and allows the user to interchange Z-orders of objects can be provided to the user.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefits of Japanese Patent Application No. 2011-187854, filed Aug. 30, 2011, and No. 2012-156927, filed Jul. 12, 2012, which are hereby incorporated by reference herein in their entirety.

What is claimed is:

1. An information processing apparatus comprising:
a display configured to display a plurality of objects having different Z-orders on a predetermined field according to the Z-orders; and
a CPU configured to perform functions of a moving unit, a determination unit, a detection unit, a Z-order interchange unit, and a Z-order matching unit;
the moving unit configured to move a first object of the plurality of objects within the field;
the determination unit configured to determine, when two objects of the plurality of objects have overlapping without the intervention of another object, that the two objects are in contact with each other;
the detection unit configured to detect a second object, which reaches a state having overlapping with the first object and then reaches a state having overlapping again via a state without any overlapping, of the plurality of objects during movement of the first object by said moving unit;
the Z-order interchange unit configured to interchange a hierarchical relation in Z-orders of the first object and the second object when said determination unit determines that the second object is in contact with the first object before and after the state without any overlapping; and
the Z-order matching unit configured to correct Z-orders of intermediate objects having Z-orders between the first object and the second object when said Z-order interchange unit interchanges the hierarchical relation in the Z-orders of the first object and the second object,
wherein said display displays the plurality of objects by reflecting interchanged Z-orders by said Z-order interchange unit during movement of the first object, and
wherein said Z-order matching unit corrects the Z-orders of the intermediate objects, so that said Z-order matching unit maintains a hierarchical relation in Z-orders with the second object before the Z-orders are interchanged for an object which was in contact with the second object and an object which was in indirect contact with the second object via a touching object of the intermediate objects, and so that said Z-order matching unit maintains a hierarchical relation in Z-orders with the first object before the Z-orders are interchanged for an object which was in contact with the first object and an object which was in indirect contact with the first object via a touching object of the intermediate objects.

2. The apparatus according to claim 1, wherein said Z-order interchange unit does not interchange the hierarchical relation in the Z-orders of the first object and the second object when said determination unit does not determine that the first object and the second object are in contact with each other before or after the state without any overlapping.

3. The apparatus according to claim 1, wherein said Z-order interchange unit interchanges the hierarchical relation in the Z-orders of the first object and the second object by switching Z-order values of the first object and the second object.

4. The apparatus according to claim 1, wherein said Z-order interchange unit interchanges the hierarchical relation in the Z-orders of the first object and the second object by changing a Z-order value of the first object or the second object to assume a value immediately above or immediately below another touching object.

5. A non-transitory computer readable recording medium recording a program for controlling a computer to function as respective units of an information processing apparatus of claim 1.

6. A control method of an information processing apparatus comprising:
a display step of displaying a plurality of objects having different Z-orders on a predetermined field according to the Z-orders;
a moving step of moving a first object of the plurality of objects within the field;

a determination step of determining, when two objects of the plurality of objects have overlapping without the intervention of another object, that the two objects are in contact with each other;

a detection step of detecting a second object, which reaches a state having overlapping with the first object and then reaches a state having overlapping again via a state without any overlapping, of the plurality of objects during movement of the first object in the moving step;

a Z-order interchange step of interchanging a hierarchical relation in Z-orders of the first object and the second object when it is determined in the determination step that the second object is in contact with the first object before and after the state without any overlapping, wherein the plurality of objects are displayed in the display step by reflecting interchanged Z-orders in the Z-order interchange step during movement of the first object; and a Z-order matching step of correcting Z-orders of intermediate objects having Z-orders between the first object and the second object when the hierarchical relation in the Z-orders of the first object and the second object is interchanged, wherein, in the Z-order matching step, the Z-orders of the intermediate objects are corrected, so that a hierarchical relation in Z-orders with the second object, before the Z-orders are interchanged for an object which was in contact with the second object, and an object, which was in indirect contact with the second object via a touching object of the intermediate objects, is maintained, and so that a hierarchical relation in Z-orders with the first object, before the Z-orders are interchanged for an object which was in contact with the first object, and an object, which was in indirect contact with the first object via a touching object of the intermediate objects, is maintained.

7. The method according to claim 6, wherein, in the Z-order interchanging step, the hierarchical relation in the Z-orders of the first object and the second object is not interchanged, when it is not determined, in the determination step, that the first object and the second object are in contact with each other before or after the state without any overlapping.

8. The method according to claim 6, wherein, in the Z-order interchange step, the hierarchical relation in the Z-orders of the first object and the second object is interchanged by switching Z-order values of the first object and the second object.

9. The method according to claim 6, wherein, in the Z-order interchange step, the hierarchical relation in the Z-orders of the first object and the second object is interchanged by changing a Z-order value of the first object or the second object to assume a value immediately above or immediately below another touching object.

* * * * *